United States Patent [19]

Iwasaki

[11] Patent Number: 5,132,526
[45] Date of Patent: Jul. 21, 1992

[54] CONFOCAL SCANNING MICROSCOPE HAVING A SIGNAL OUTPUT REGULATING MEANS

[75] Inventor: Osamu Iwasaki, Kanagawa, Japan

[73] Assignee: Fuji Photo Film Co., Ltd., Kanagawa, Japan

[21] Appl. No.: 682,768

[22] Filed: Apr. 9, 1991

[30] Foreign Application Priority Data

Apr. 10, 1990 [JP] Japan ................................. 2-94652

[51] Int. Cl.$^5$ ................................................ G01J 1/20
[52] U.S. Cl. ............................... 250/201.3; 250/23 H; 359/368
[58] Field of Search ............... 250/201.3, 201.4, 201.5, 250/216, 23 H; 359/368, 507, 508

[56] References Cited

U.S. PATENT DOCUMENTS

| | | | |
|---|---|---|---|
| 4,684,797 | 8/1987 | Ando et al. | 250/207.5 |
| 4,900,910 | 2/1990 | Doi | 250/201.5 |
| 4,992,652 | 2/1991 | Okada | 250/201.4 |
| 5,065,008 | 11/1991 | Hakamata et al. | 250/216 |
| 5,081,349 | 1/1992 | Iwasaki | 250/23 H |
| 5,081,350 | 1/1992 | Iwasaki et al. | 250/23 H |
| 5,084,612 | 1/1992 | Iwasaki et al. | 250/216 |

FOREIGN PATENT DOCUMENTS 62-217218 9/1987 Japan.

Primary Examiner—David C. Nelms
Assistant Examiner—Que T. Le
Attorney, Agent, or Firm—Sughrue, Mion, Zinn, Macpeak & Seas

[57] ABSTRACT

A confocal scanning microscope comprises a specimen support, a light source, a light-projecting optical system, a light-receiving optical system, a light detector, a mechanism for two-dimensionally scanning the specimen with the light spot, an image reproduction means, a focus monitoring means which monitors the state of convergence of the light spot on the specimen, and a signal output regulating means for selectively forwarding the signal output by the light detector to the image reproducing means only when the focus monitoring means detects that the light spot is properly focused on the specimen.

16 Claims, 4 Drawing Sheets

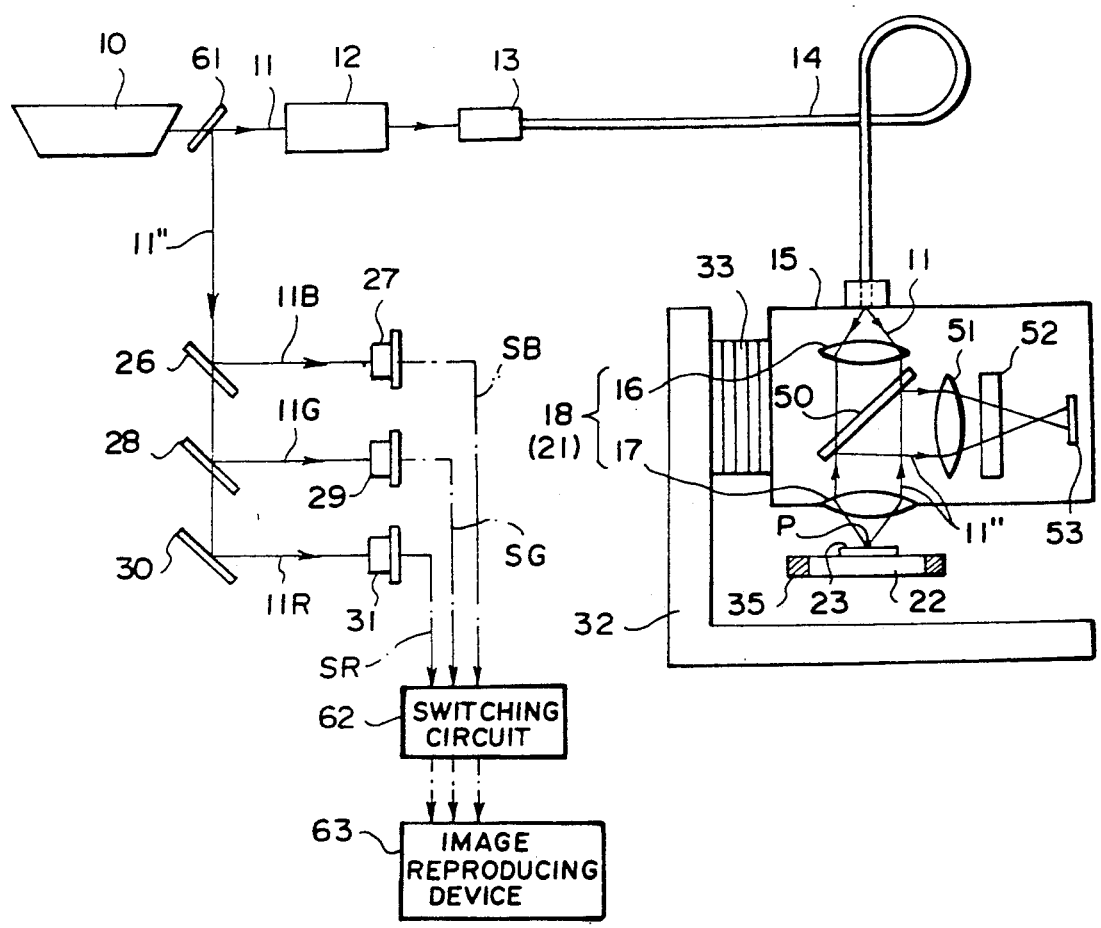
F I G.1

CONFOCAL SCANNING MICROSCOPE HAVING A SIGNAL OUTPUT REGULATING MEANS

BACKGROUND OF THE INVENTION

1. Field of the Invention

The present invention relates to a confocal scanning microscope, and more particularly to a confocal scanning microscope capable of producing a high contrast microscopic image.

2. Description of the Prior Art

The prior art includes optical scanning microscopes which converge a beam of illuminating light to a small light spot, two-dimensionally scan a specimen with the light spot, detect light transmitted through or reflected from as well as fluorescence emitted by the specimen by means of a photodetector, and produce an electric signal carrying an enlarged image of the specimen.

One type of such confocal scanning microscope is constituted so as to converge the illuminating light emitted by a light source to a light spot on the specimen, to cause the light from the specimen to be once again converged to a light spot, and to detect the reconverged light by means of a light detector. Since the confocal scanning microscope constituted in this manner does not require a pinhole to be disposed over the specimen surface, it is easy to fabricate.

As can be seen from the example of this type of confocal microscope disclosed in Japanese Unexamined Patent Publication No. 62(1987)-217218, in its basic structure the microscope consists of a light source for emitting illuminating light, a specimen supporting member for supporting a specimen, a light-projecting optical system for converging the illuminating light to a small light spot on the specimen, a light-receiving optical system for focusing the light from the specimen (the transmitted or reflected light together with fluorescence) as a spot image, a light detector for detecting the spot image, a scanning mechanism for two-dimensionally scanning the specimen with the light spot, and an image reproducing means for reproducing an image from the signal output by the light detector.

In the confocal scanning microscope of this type, it is necessary to converge the illuminating light beam to a point on the surface of or within the specimen with high precision, and for this it is necessary, for example, to fine-adjust the position of the specimen supporting member in the direction of the optical axis.

Since the conventional confocal scanning microscope is able to produce an image signal even when the illuminating light is not precisely focused, however, image reproduction has frequently been conducted in a less than perfectly focused condition. As a result, the microscopic image obtained has frequently suffered from poor contrast.

SUMMARY OF THE INVENTION

The object of the present invention is to provide a confocal scanning microscope capable of preventing the aforesaid problem.

For realizing this object, the invention provides a confocal scanning microscope comprising a specimen supporting member, a light source, a light-projecting optical system, a light-receiving optical system, a light detector, a mechanism for two-dimensionally scanning a light spot and an image reproduction means, which are respectively of the type described in the foregoing, the microscope being characterized in that it further comprises a focus monitoring means which receives at least part of the light from the specimen and on the basis thereof monitors the state of convergence of the illuminating light on the specimen, and a signal output regulating means for selectively forwarding the signal output by the light detector to the image reproducing means only when the focus monitoring means detects that the light spot is properly focused on the specimen.

Since with this arrangement the signal output by the light detector is forwarded to the image reproducing means only when the illuminating light is precisely focused with respect to the specimen, it is possible to ensure that only microscopic images exhibiting high contrast will be reproduced.

The focus monitoring means can, for example, be constituted in the same manner as the focus error detection mechanism commonly used in the pickups of optical disk systems. As the signal output regulating means there can be used one which prevents the signal output by the light detector from being sent to the image reproducing means or one which disables the operation of the light detector.

BRIEF DESCRIPTION OF THE DRAWINGS

FIG. 1 is a schematic plan view of a confocal scanning microscope according to a first embodiment of the invention.

DESCRIPTION OF THE PREFERRED EMBODIMENTS

The present invention will hereinbelow be described in further detail with reference to the accompanying drawings.

Figure 2:
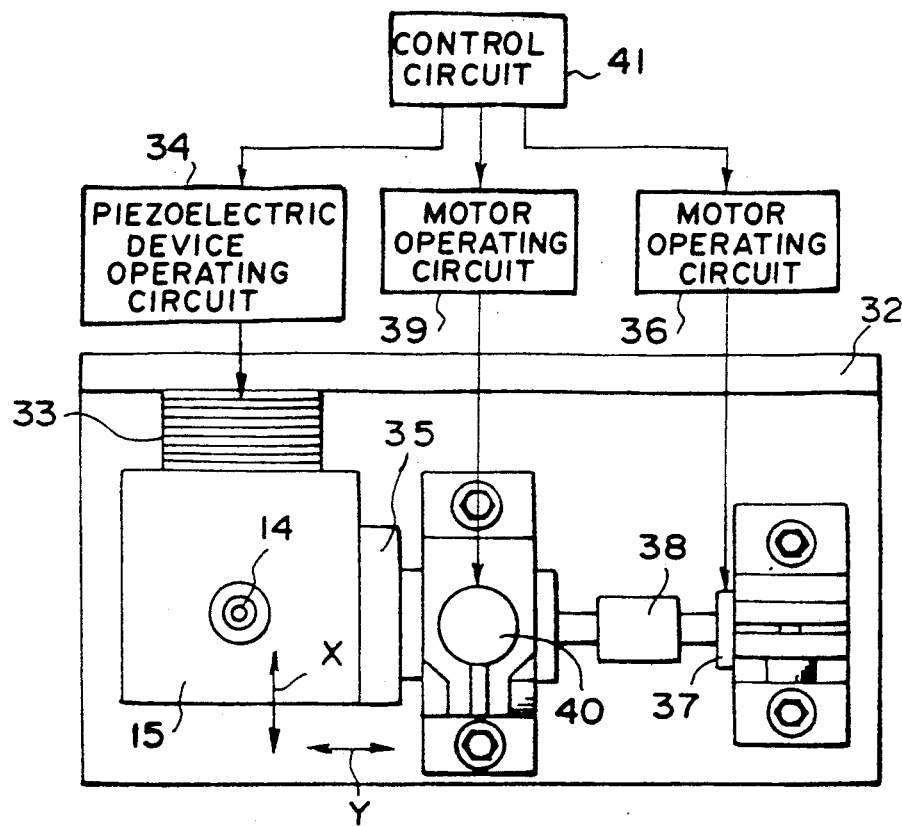
FIGS. 2 and 3 are a plan view and a side view of the essential part of the same confocal scanning microscope.
Figure 3:
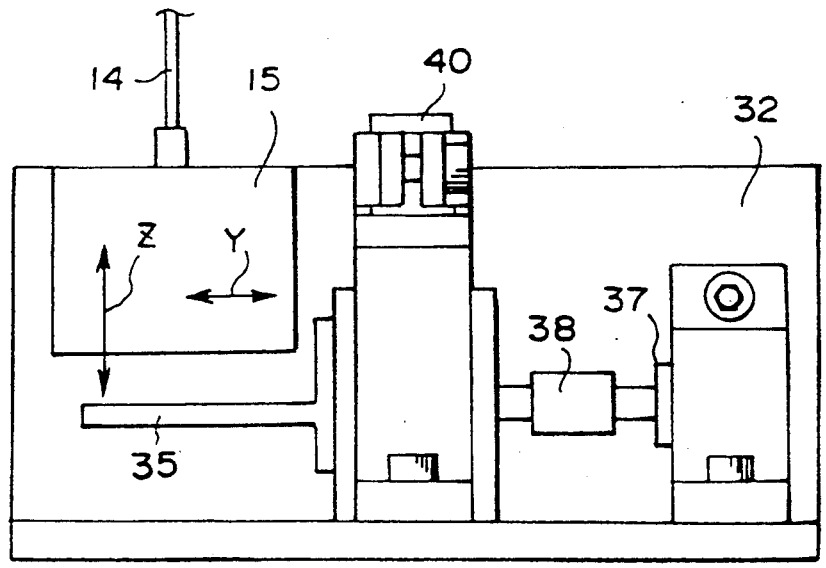

The scanning mechanism of the reflection confocal scanning microscope according to the first embodiment of the invention shown in FIG. 1 is illustrated in detail in FIGS. 2 and 3. Referring first to FIG. 1, an RGB laser 10 emits illuminating light 11 made up of red, green and blue light components. After the beam of illuminating light 11 has been reduced in diameter by passage through a beam compressor 12, it advances through a distributed index lens 13 and the resulting condensed beam enters one end of a single-mode optical fiber 14.

The illuminating light 11 travels through the optical fiber 14 and exits from the other end thereof, which is secured to a movable table 15. At this time, the other end of the optical fiber 14 emits the illuminating light 11 in the manner of a point light source. A light-projecting optical system 18 consisting of a collimator lens 16 and an object lens 17 is mounted on the movable table 15. In the present embodiment, the light-projecting optical system 18 doubles as a light-receiving optical system 21. A beam splitter 50 (to be explained later) is disposed between the lenses 16, 17. A specimen supporting member 22 constituted separately from the movable table 15 is provided beneath the object lens 17.

The illuminating light 11 collimated into a beam of parallel rays by the collimator lens 16 is then converged by the object lens 17 so as to form a small light spot P on the surface of a specimen 23 mounted on the specimen supporting member 22. The light 11″ reflected by the specimen 23 is collimated by the object lens 17, whereafter a part thereof transmitted by the beam splitter 50 is converged by the collimator lens 16 and reenters the single-mode optical fiber 14. This reflected light 11″ then advances back trough the optical fiber 14, the distributed index lens 13 and the beam compressor 12 to impinge on a beam splitter 61, which reflects a part thereof onto a dichroic mirror 26.

The dichroic mirror 26 reflects only the blue light component 11B of the reflected light 11″ toward a first light detector 27 which detects the same. The light component transmitted by the dichroic mirror 26 impinges on a dichroic mirror 28 which reflects only the green light component 11G thereof toward a second light detector 29 which detects the same. The light component transmitted by the dichroic mirror 28 (the red light component 11R) is reflected by a mirror 30 toward a third light detector 31 which detects the same. The light detectors 27, 29, 31, which can be photodiodes or the like, produce signals SB, SG, SR carrying the blue, green and red components of an enlarged image of the specimen 23.

While the final destination of the signals SB, SG and SR is an image reproducing device 63 such as a CRT display or a light scanning recording device, these signals are first passed through a switching circuit 62 which appropriately regulates (permits or prevents) their output. This signal output regulation will explained in detail later.

First, the two-dimensional scanning of the specimen with the illuminating light spot P will be explained with reference to FIGS. 2 and 3. FIG. 2 is a top view and FIG. 3 a right side view of the movable table 15 and the surrounding parts. The movable table 15 is secured to a laminated piezoelectric device 33 which is in turn secured to a frame 32. The laminated piezoelectric device 33 receives electric power from a piezoelectric device operating circuit 34 and reciprocally moves the movable table 15 at high speed in the main scanning direction indicated by the double headed arrow X. The frequency of the reciprocal movement is set at 10 kHz, for example. Where the scanning width is 100 μm, this frequency results in a main scanning speed of $$10 \times 10^3 \times 100 \times 10^{-6} \times 2 = 2 \ m/s$$

The flexibility of the optical fiber 14 enables it to follow the movement of the movable table 15 without interference to the transmission of the illuminating light 11 and reflected light 11″ therethrough.

The specimen supporting member 22 is secured to a two-dimensionally movable stage 35. The stage 35 is connected to a micrometer 38 which is in turn connected to a pulse motor 37. In response to operating current from a motor operating circuit 36, the pulse motor 37 reciprocally drives the two-dimensionally movable stage 35 in the sub-scanning direction indicated by the double headed arrow Y. The specimen supporting member 22 is thus moved relative to the movable table 15 so that the specimen 23 is scanned by the light spot P in both the main scanning direction X and the sub-scanning direction Y lying normal thereto.

If, for instance, the time required per scan in the sub-scanning direction is 1/20 second and the sub-scanning width is 100 μm, the sub-scanning speed becomes $$20 \times 100 \times 10^{-6} = 0.002 \ m/s$$
$$= 2 \ mm/sec$$

This speed is considerably lower than the main scanning speed and, specifically, is low enough to ensure that the specimen 23 will not fly off the specimen supporting member 22.

The two-dimensional scanning of the specimen 23 by the light spot P in the aforesaid manner makes it possible to obtain the time series signals SB, SG, SR carrying a two-dimensional image of the specimen 23. For obtaining discrete picture element signals, these signals are, for example, integrated once every predetermined time period.

In this embodiment, the two-dimensionally movable stage 35 is also moved in the direction indicated by the double headed arrow Z by a pulse motor 40 driven by operating current received from a motor operating circuit 39. The direction Z lies parallel to the common optical axis of the light-projecting and light-receiving optical systems 18 and 21 and perpendicular to the main and sub-scanning directions X and Y. The position of the stage 35 is incremented by discrete distances in the Z direction and the specimen is two-dimensionally scanned by the light spot P after the stage 35 has been stopped at each position. The light detectors 27, 29, 31 thus detect only the information at the focusing plane even when there are fine surface irregularities on the specimen 23. Since the SB, SG, SR signals output by the light detectors 27, 29, 31 are stored in a frame memory it becomes possible to obtain signals representing a well-focused image for each of the focusing planes at which the stage 35 was stopped.

The piezoelectric device operating circuit 34 and the motor operating circuits 36, 39 receive synchronizing signals from a control circuit 41 which they use for synchronizing the main and sub-scanning by the light spot P with the movement of the specimen supporting member 22 by discrete increments in the Z direction.

Figure 4:
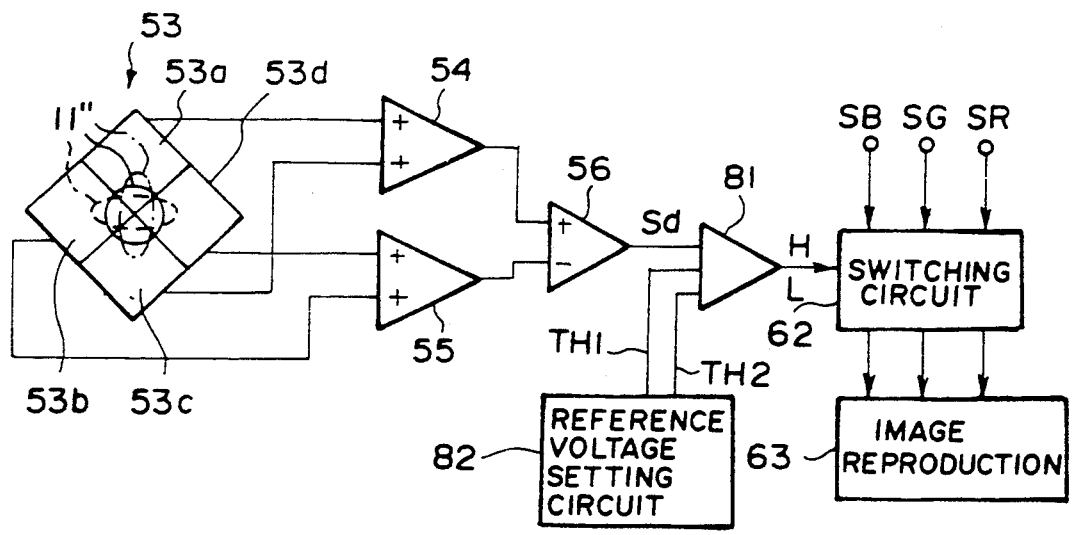
FIG. 4 is a diagram showing the electric circuit of the same confocal scanning microscope.

The manner in which the switching circuit 62 regulates the output of the SB, SG, SR signals will now be explained. A portion of the light 11″ reflected by the specimen 23 is reflected by the beam splitter 50 so as to pass through a condenser lens 51, constituted as a spherical lens, and a cylindrical lens 52 to be focused on a 4-segment photodetector 53. As shown in FIG. 4, the 4-segment photodetector 53 consists of four photodetectors or other such light detection elements 53a, 53b, 53c, 53d arranged such that the adjacent edges of the segments make an angle of 45° with the vertical. On the other hand, the cylindrical lens 52 is oriented so as to have curvature only in the horizontal plane.

As shown in FIG. 4, the outputs of the top and bottom light detection elements 53a, 53c are connected with the inputs of a summing amplifier 54 and the left and right light detection elements 53b, 53d are connected to the inputs of a summing amplifier 55. The outputs of the summing amplifiers 54, 55 are input to a differential amplifier 56.

The elements 50 to 56 described above constitute the focus monitor means in this embodiment.

As the foregoing arrangement detects read-out light focus error by the astigmatic method, it is constituted in basically the same manner as the pickup widely employed with optical disk systems. When the illuminating light 11 is focused on the surface of the specimen 23, the reflected light 11" forms a substantially true circular image on the 4-segment photodetector 53 (as shown by a solid line in FIG. 4). In this case, the outputs of the light detectors 53a-53d are approximately equal and, as a result, the output Sd of the differential amplifier 56 is at or near zero.

In contrast, when the surface of the specimen 23 is further from the object lens 17 than the focal position of the illuminating light 11, the image formed on the 4-segment photodetector 53 by the reflected light 11" is in the shape of an ellipse with a horizontal major axis (as shown by a broken line in FIG. 4). In this case, the output of the summing amplifier 55 becomes greater than that of the summing amplifier 54 so that the output Sd of the differential amplifier 56 is negative.

Further, when the surface of the specimen 23 is nearer to the object lens 17 than the focal position of the illuminating light 11, the image formed on the 4-segment photodetector 53 by the reflected light 11" is in the shape of an ellipse with a vertical major axis (as shown by a chain line in FIG. 4). In this case, the output of the summing amplifier 55 is smaller than that of the summing amplifier 54 so that the output Sd of the differential amplifier 56 is positive.

The output Sd of the differential amplifier 56 is forwarded to a window comparator 81 where it is compared with the output from a reference voltage setting circuit 82. When signal Sd falls between outputs TH1 and TH2 of the reference voltage setting circuit 82, the output of the window comparator 81 is at high level H and when it is outside this range, the output of the window comparator 81 is at low level L.

The switching circuit 62 to which the signals SB, SG, SR are input outputs these signals to the image reproducing device 63 when and only when the output of the window comparator 81 is high level H. Specifically, it does not allow them to reach the image reproducing device 63 when the window comparator 81 produces a low level output L. This means that the signals SB, SG, SR are not forwarded to the image reproducing device 63 when the illuminating light 11 is not properly focused on the specimen 23. The microscope thus does not produce a microscopic image in the case where the image would be of low contrast and poor quality because the illuminating light 11 is not properly focused on the specimen.

In actual imaging, the specimen supporting member 22 is first set at what the operator considers to be an appropriate position on the optical axis and scanning of the specimen with the illuminating light is repeated once each time the specimen supporting member 22 has been moved by a very small distance to a new position on the optical axis. Eventually, therefore, there will always be obtained a microscopic image of optimum quality.

The embodiment just described can be modified in various ways. For example, instead of using the distributed index lens 13 for inputting the beam of illuminating light 11 reduced by the beam compressor 12 to the optical fiber 14, it is possible to use the object lens of the microscope or other such lens for this purpose. On the other hand, the single-mode optical fiber 14 can be replaced by a multimode optical fiber fitted with a pinhole or the like.

In addition, the pulse motor 37 used as the power source for reciprocating the specimen supporting member 22 mounted on the two-dimensionally movable stage 35 in the Y direction (sub-scanning direction) can be replace by a DC motor equipped with an encoder, while in either case the sub-scanning of the specimen by the light spot P need not necessarily be conducted by moving the specimen supporting member 22 but can alternatively be conducted by moving the movable table 15. On the other hand, in place of using the laminated piezoelectric device 33 used for moving the movable table 15 there can be used, for example, a scanning system employing a voice coil in combination with the characteristic frequency of a solid body applied with supersonic sound waves.

It is also possible to orient the cylindrical lens 52 so that its curvature falls in the vertical plane.

Figure 5:
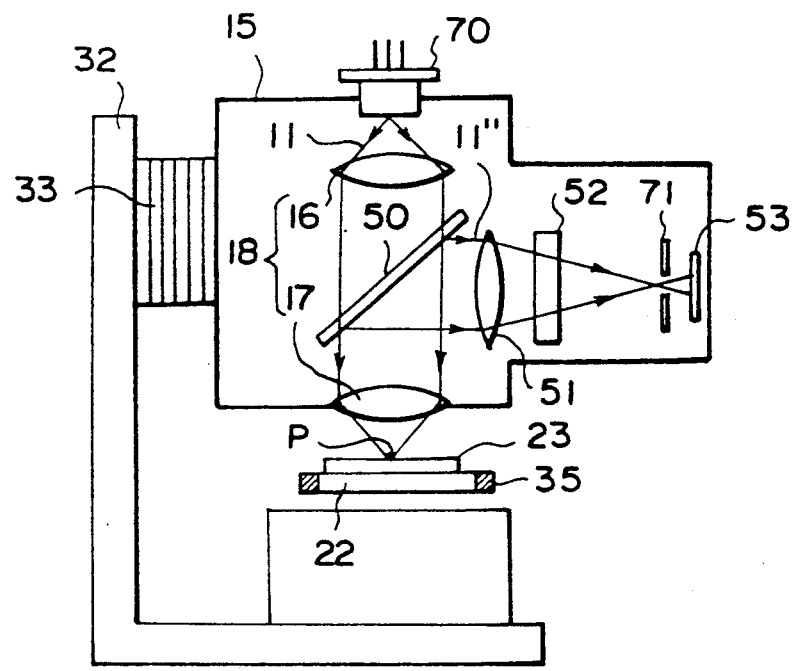
FIG. 5 is a schematic plan view of a confocal scanning microscope according to a second embodiment of the invention.

FIG. 5 illustrates a monochrome confocal scanning microscope according to another embodiment of the invention. In this embodiment the light-projecting optical system again doubles as the light-receiving optical system and the light source and the light detector are both fixed on the movable table. The optical system is thus simplified to provide a more compact confocal scanning microscope. In FIG. 5, those elements which are the same as or similar to the elements of the embodiment shown in FIGS. 1 to 3 are assigned the same reference symbols and will not be discussed again.

The source of the illuminating light 11 in this embodiment is a laser diode 70 fixed on the movable table 15. The illuminating light 11 emitted by the laser diode 70 directly enters the light-projecting optical system 18, which is also fixed on the movable table 15, and is thereby focused as a small light spot P on the surface of the specimen 23 in the same manner as in the preceding embodiment.

The light 11" reflected by the specimen 23 is collimated by the object lens 17 and reflected by the beam splitter 50, whereafter it passes through the condenser lens 51, the cylindrical lens 52 and an aperture pinhole 71 for cutting halo and scattered light therefrom and forms an image on the 4-segment photodetector 53.

Figure 6:
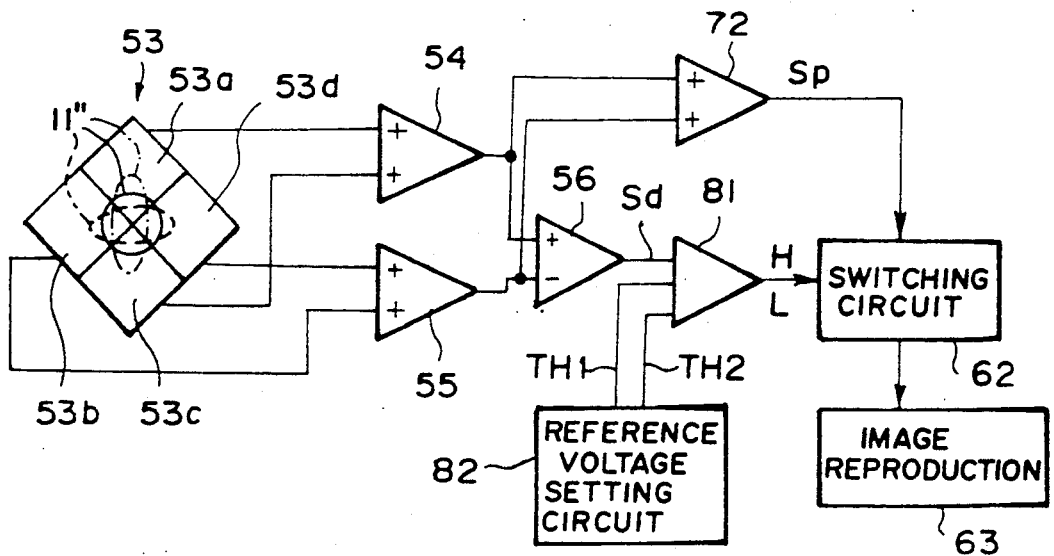
FIG. 6 is a diagram showing the electric circuit of the confocal scanning microscope according to the second embodiment of the invention.

In this embodiment, the beam splitter 50 and the lenses 51, 52 constituting the focus monitor means also serve as the light converging optical system for microscopic imaging. Further, the 4-segment photodetector 53 also serves as the microscope's light detector for microscopic imaging. More specifically, as shown in the circuit diagram of FIG. 6, the outputs of the summing amplifiers 54, 55 are further sent to a summing amplifier 72 whose output is a signal Sp indicating the total amount of the light 11" passing through the aperture pinhole 71.

The signal Sp is input to a switching circuit 62 like that illustrated in FIGS. 1 and 4 where it regulates the output of the switching circuit 62 in the same manner as in the first embodiment.

In this invention it is possible to omit the pinhole of the light-receiving optical system (the aperture pinhole 71 in the case of the embodiment according to FIG. 5) and still obtain a microscopic image exhibiting good contrast. However, in this case it is necessary to eliminate background noise by setting a threshold for the image signal Sp and cutting out that part of the signal falling below the threshold.

It should be noted that the focus monitoring means used in this invention need not rely on the astigmatic method can alternatively employ some other method such as the critical angle detection method or the knife-edge prism method.

Moreover, while in the embodiments described in the foregoing the light-projecting and light-receiving optical systems are fixed to the movable table and main scanning of the illuminating light is conducted by reciprocal movement of the movable table, it is of course possible to employ a different type of scanning mechanism in this invention.

The scanning mechanism used in the foregoing embodiments is advantageous, however, in that it prevents the specimen from flying off its support during high-speed scanning, as is likely to happen when main scanning is conducted by reciprocally moving the specimen. Moreover since the scanning mechanism does not conduct scanning of the light spot by deflection of the illuminating light beam, the optical system can be designed taking into account only the light rays at the optical axis. This makes the design work exceedingly simple.

As described in the foregoing, in the confocal scanning microscope according to the present invention the state of focusing of the illuminating light with respect to the specimen is monitored by the focus monitoring means and the microscopic image-carrying signal(s) output by the light detector(s) is/are forwarded to the image reproducing device only when the illuminating light is properly focused on the specimen. As a result, it is always possible to reproduce a high-quality microscopic image. This arrangement further ensures a microscopic image exhibiting good contrast even when an optical system with a relatively small numerical aperture is used.

I claim:

1. A confocal scanning microscope comprising:
   a specimen supporting member,
   a light source for producing a beam of illuminating light,
   a light-projecting optical system for converging the illuminating light to a small light spot on the specimen,
   a light-receiving optical system for condensing transmitted or reflected light and fluorescent light from the specimen and focusing the same as a point image,
   at least one light detector for detecting the point image,
   a mechanism for two-dimensionally scanning the specimen with the light spot,
   an image reproduction means for reproducing an image using a signal produced by the light detector,
   a focus monitoring means which receives at least part of the light from the specimen and on the basis thereof monitors the state of convergence of the illuminating light spot on the specimen, and
   a signal output regulating means for selectively forwarding the signal output by the light detector to the image reproducing means only when the focus monitoring means detects that the illuminating light spot is properly focused of the specimen.

2. A confocal scanning microscope as defined in claim 1 wherein the signal output regulating means prevents the signal output by the light detector from being forwarded to the image reproducing means when the illuminating light spot is not properly focused on the specimen.

3. A confocal scanning microscope as defined in claim 1 wherein the signal output regulating means disables the light detector when the illuminating light spot is not properly focused on the specimen.

4. A confocal scanning microscope as defined in claim 1 wherein the light source is an RGB laser.

5. A confocal scanning microscope as defined in claim 1 wherein the light source is a laser diode.

6. A confocal scanning microscope as defined in claim 1 wherein the light-projecting optical system comprises a collimator lens and an object lens.

7. A confocal scanning microscope as defined in claim 6 wherein the light-projecting optical system also serves as the light-receiving optical system.

8. A confocal scanning microscope as defined in claim 1 wherein the light detector consists of three light detectors which respectively detect red, green and blue light components.

9. A confocal scanning microscope as defined in claim 8 wherein the light detectors are photodiodes.

10. A confocal scanning microscope as defined in claim 1 wherein the mechanism for two-dimensionally scanning the specimen with the light spot comprises a movable table on which the light-projecting and light-receiving optical systems are mounted, means for reciprocally moving the movable table in a main scanning direction, a stage for retaining the specimen supporting member and means for reciprocally moving the stage in the sub-scanning direction.

11. A confocal scanning microscope as defined in claim 10 wherein the means for reciprocally moving the movable table in the main scanning direction operates at a much higher speed than the means for reciprocally moving the stage in the sub-scanning direction.

12. A confocal scanning microscope as defined in claim 10 further comprising means for moving the stage in parallel to a common optical axis of the light-projecting and light-receiving optical systems.

13. A confocal scanning microscope as defined in claim 1 wherein the focus monitoring means detects light focus error by an astigmatic method.

14. A confocal scanning microscope as defined in claim 13 wherein the focus monitoring means comprises a 4-segment photodetector.

15. A confocal scanning microscope as defined in claim 10 wherein the light source is mounted on the movable table.

16. A confocal scanning microscope as defined in claim 14 wherein the focus monitoring means also serves as the light detector.

* * * * *